June 1, 1948.  B. V. HOLBERTON  2,442,691
AIRCRAFT PROPELLER
Filed May 4, 1943
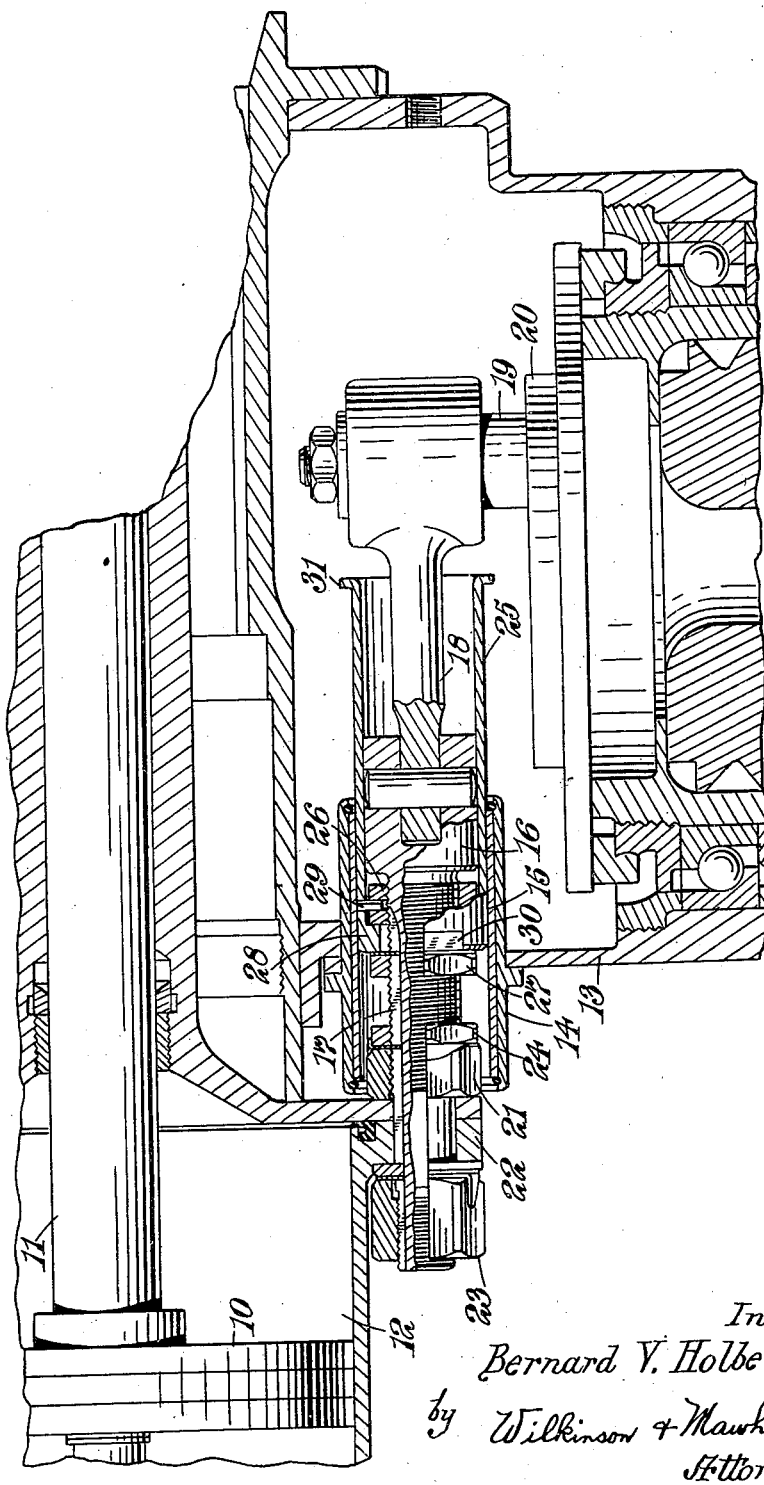
Inventor
Bernard V. Holberton
by Wilkinson & Mawhinney
Attorneys

UNITED STATES PATENT OFFICE 2,442,691

AIRCRAFT PROPELLER

Bernard Victor Holberton, Cheltenham, England, assignor to Rotol Limited, a British company Application May 4, 1943, Serial No. 485,633
In Great Britain March 24, 1942

Section 1, Public Law 690, August 8, 1946
Patent expires March 24, 1962

6 Claims. (Cl. 308—3)

This invention concerns variable-pitch propellers of the kind described in the specification of British Patent No. 455,074 in which the pitch-changing movements of the blades are effected by a member mounted in front of the propeller-hub and axially movable in relation thereto, said member being connected to the blades through sliding members which are guided in sleeves fixed in the wall of the hub and are connected respectively to the axially movable member and to a crank-pin on a blade-root. When the propeller is of the feathering type, the axially movable member has a relatively large axial travel to provide the necessary angular movement of the blades, this requiring long guides in the wall of the hub.

The object of this invention is to reduce the overall axial length of the propeller-hub and pitch-adjusting mechanism, and a further object is to provide a construction of guide assembly which will permit the axially movable member to be positioned closely adjacent to the hub at one end of its travel.

This invention accordingly consists in a propeller of the type above described wherein each sliding-member has secured on it a hollow sleeve arranged to slide within the guide in the wall of the hub; preferably, the said sleeve is adjustable axially relatively to the sliding member, and according to another feature of this invention the said sleeve may be adjustably secured at one end to the part connecting the sliding-member to the axially movable member, and also supported intermediate of its ends on the sliding-member itself.

A construction in accordance with this invention will now be described, by way of example only, with reference to the accompanying drawing which is an axial section through the lower half of a propeller hub embodying the invention. In the construction shown the pitch-adjustment of the blades is effected by a hydraulic ram constituted by a fixed piston 10 carried on the propeller shaft 11 on the forward end thereof, with a double-acting hydraulic cylinder 12 which is movable relatively thereto axially of the propeller shaft.

Upon the hub 13 of the propeller there are mounted guide-members, one for each blade, consisting of tubes 14 disposed parallel with the axis of the shaft 11 and each having a bearing bush 15 in it and in each of them there is mounted a sliding member or crosshead 16 which is connected on one side by a rod 17 to the hydraulic cylinder 12, and on the other side by a connecting rod 18 to a crank-pin 19 on the root-end 20 of a blade of the propeller.

The rod 17 connecting the sliding-member to the hydraulic cylinder is screw-threaded to receive a nut 21 against which a flange 22 on the cylinder abuts, and is also screw-threaded at its outer end to receive a second nut 23 by which the flange 22 is secured to the rod 17, and by adjustment of these two nuts 21 and 23 on the rod, the requisite accurate setting of the cylinder 12 in its axial movement with respect to the angular position of the crank-pin 19 on the blade is easily effected. A lock-nut 24 is provided to lock the nut 21 in its correct setting.

A sleeve or hollow guide 25 surrounds the cross-head and is a sliding fit in the bush 15 of the fixed guide in the propeller-hub, and it is also made a close fit on the cross-head 16 itself which lies intermediate the ends of this sleeve. The sleeve 25 is secured to the cross-head by means of two nuts 26 and 27 screwed on to the cylinder-rod aforesaid, so as to grip between them an inturned flange or projection 28 on the sleeve, thereby rigidly fastening it to the rod 17, and to the cross-head so that, by its bearing in the hub-guide it constitutes a suitable guide for the cross-head.

The length of this sleeve 25 may be substantially greater than that of the hub-guide 14—15 so that in the full range of movement of the cylinder, the crosshead 16 proper may move beyond the ends of the hub-guide without impairing the lateral constraint required to guide it in its movement; the sleeve 25 is made of such an internal diameter as to permit the obliquity of the coupling rod 18 which arises at the two ends of its stroke.

With this arrangement the cylinder flange 22 may approach closely to the end of the hub-guide 14—15 at one end of its stroke, and, when it is at the other or outer end of its stroke, the cylinder-rod 17 and the nuts 21 and 27 on it are readily accessible for making adjustments. In order to adjust the position of the sleeve 25 with respect to the crosshead 16 the nut 26 inside the guide-sleeve is pinned thereto by a pin 29 so that rotation of the sleeve will adjust the nut 26 on the cylinder-rod. The sleeve is provided with flats 30 by which it may be turned.

The other end of the sleeve has an outwardly-turned flange 31 adapted to bear against the fixed guide 14—15 so as to limit the forward travel of the cylinder. This end position may be feathered position of the blades and the adjustment above-described enables very accurate setting of the blades to be effected, even after the propeller is installed on the engine-shaft.

It will be seen that by the provision of the additional guide-sleeve as described above, the length of the hub-guide may be substantially reduced, thereby enabling a considerable reduction to be made in the overall axial length of the propeller-hub and the blade-actuating mechanism, and this reduction in length, together with the consequent reduction in weight which is all overhanging weight on the propeller shaft, is particularly advantageous.

I claim:

1. In combination, a movable member, a guide, a sliding member coupled to said movable member and slidable in said guide, a hollow sleeve receiving said sliding member and fixed with respect thereto and interposed between said sliding member and said guide, said sleeve axially adjustable relatively to said sliding member and means to secure said sleeve against movement after adjustment.

2. In combination, a motor having a movable member, a movable follower to be adjusted by said movable member, a guide, a sliding member coupled to said follower and having a part coupled to said movable member, a sleeve adjustably secured at one end portion to said part and supported intermediate its ends on said sliding member.

3. In a connecting rod coupling, the combination of an axially movable rod, a cross head thereon, a stationary guide for said cross head of a length less than the maximum travel of said cross head, a second rod pivoted on said cross head, a sleeve secured on said first named rod with its inner surface engaging said cross head and its outer surface engaging said guide, said sleeve extending beyond the cross head to surround said second rod.

4. In the combination of claim 2, in which said part is a screw-threaded rod, said sleeve having an inturned portion, and nuts threaded on the rod and engaging opposite sides of said inturned portion.

5. In the combination of claim 2, in which said part is a screw-threaded rod, said sleeve having an inturned portion, and nuts threaded on the rod and engaging opposite sides of said inturned portion, one of said nuts being within said sleeve and fast thereto and rotatable and adjustable by the act of rotating said sleeve.

6. The combination of claim 2, wherein said sleeve has an out-turned flange adapted to engage an end of said guide to limit the movement of the parts in one direction.

BERNARD VICTOR HOLBERTON.

REFERENCES CITED

The following references are of record in the file of this patent:

UNITED STATES PATENTS

| Number | Name | Date |
|---|---|---|
| 1,806,325 | Wooden | May 19, 1931 |
| 1,862,235 | Morris | June 7, 1932 |
| 2,156,102 | Austin | Apr. 25, 1939 |

FOREIGN PATENTS

| Number | Country | Date |
|---|---|---|
| 455,044 | Great Britain | Oct. 8, 1936 |
| 538,621 | Great Britain | Aug. 11, 1941 |